US006925192B2

(12) United States Patent
Honsinger et al.

(10) Patent No.: US 6,925,192 B2
(45) Date of Patent: Aug. 2, 2005

(54) AUTHENTICATABLE IMAGE WITH AN EMBEDDED IMAGE HAVING A DISCERNIBLE PHYSICAL CHARACTERISTIC WITH IMPROVED SECURITY FEATURE

(75) Inventors: Chris W. Honsinger, Ontario, NY (US); David L. Patton, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 681 days.

(21) Appl. No.: 09/930,634

(22) Filed: Aug. 15, 2001

(65) Prior Publication Data

US 2003/0035564 A1 Feb. 20, 2003

(51) Int. Cl.[7] .................................................. H04K 1/00
(52) U.S. Cl. ..................... 382/100; 358/3.28; 713/176
(58) Field of Search ................................ 382/100, 232; 380/287, 252, 54, 51; 713/176; 358/3.28

(56) References Cited

U.S. PATENT DOCUMENTS

| | | | |
|---|---|---|---|
| 5,835,639 A | 11/1998 | Honsinger et al. | 382/278 |
| 5,850,481 A | * 12/1998 | Rhoads | 382/232 |
| 5,905,819 A | 5/1999 | Daly | 382/284 |
| 6,044,156 A | 3/2000 | Honsinger et al. | 380/54 |
| 6,205,249 B1 | 3/2001 | Moskowitz | 382/232 |
| 6,614,914 B1 * | 9/2003 | Rhoads et al. | 382/100 |

FOREIGN PATENT DOCUMENTS

| EP | 0 777 197 A2 | 6/1997 | G06T/1/00 |
|---|---|---|---|
| WO | WO 00/65541 A1 * | 11/2000 | G07B/17/00 |

OTHER PUBLICATIONS

Honsiger, "Data Embedding Using Phase Dispersion," *IEE Seminar on Secure Images and Image Authentication*, Apr. 2000, p 5/1–5/7.*
Marvel et al., "Spread Spectrum Image Steganography," *IEEE Trans, on Image Processing*, vol. 8, No. 8, Aug. 1999, pp. 1075 1083.*
De Strycker et al., "An Implementation of a Real-Time Digital Watermaking Process for Broadcast Monitoring on a Trimedia VLIW Processor," *Proc. 7th Int. Conf. on Image Processing and its Applications*, Jul. 1999, pp. 775–779.*
U.S. Appl. No. 09/613,989, filed Jul. 11, 2000, by Chris Honsinger,"Authenticatable Image with An Embedded Image Having A Discernible Physical Characteristic".
U.S. Appl. No. 09/453,247, filed Dec. 2, 1999, by Chris Honsinger, "Method and Computer Program For Extracting An Embedded Message From A Digital Image".
U.S. Appl. No. 09/453,160, filed Dec. 2, 1999, by Chris Honsinger, "Method and Computer Program For Embedding And Extracting An Embedded Message From A Digital Image".

* cited by examiner

*Primary Examiner*—Andrew W. Johns
(74) *Attorney, Agent, or Firm*—Peyton C. Watkins

(57) ABSTRACT

A method is disclosed for printing an authenticatable image having an embedded image into a receiver having a discernible physical characteristic, such that the printed image can be used to authenticate the receiver includes scanning the receiver to produce information related to the discernible physical characteristic of the receiver, and providing a carrier which includes information related to the scanned receiver discernible physical characteristic. The method also includes combining the carrier with an input image to form the authenticatable image having the embedded image, and printing the authenticatable image having the embedded image onto the receiver.

8 Claims, 5 Drawing Sheets

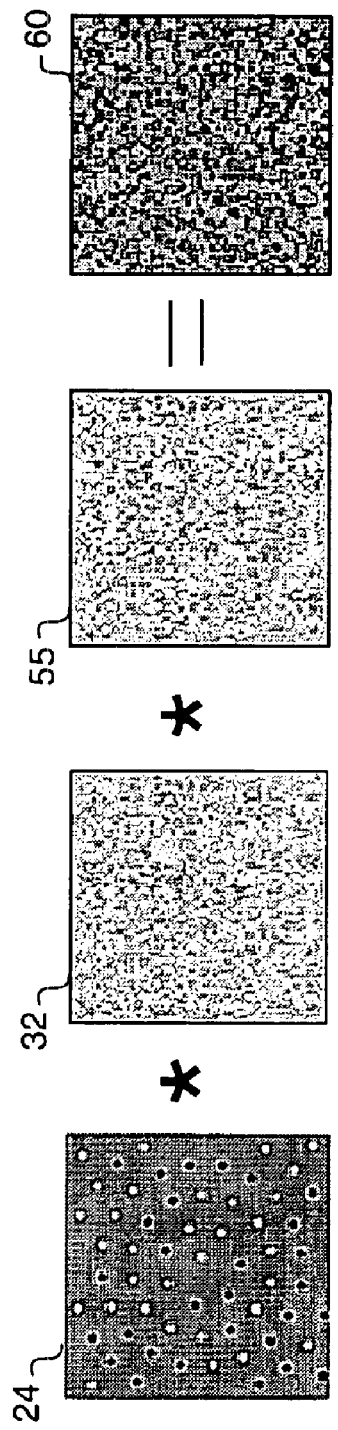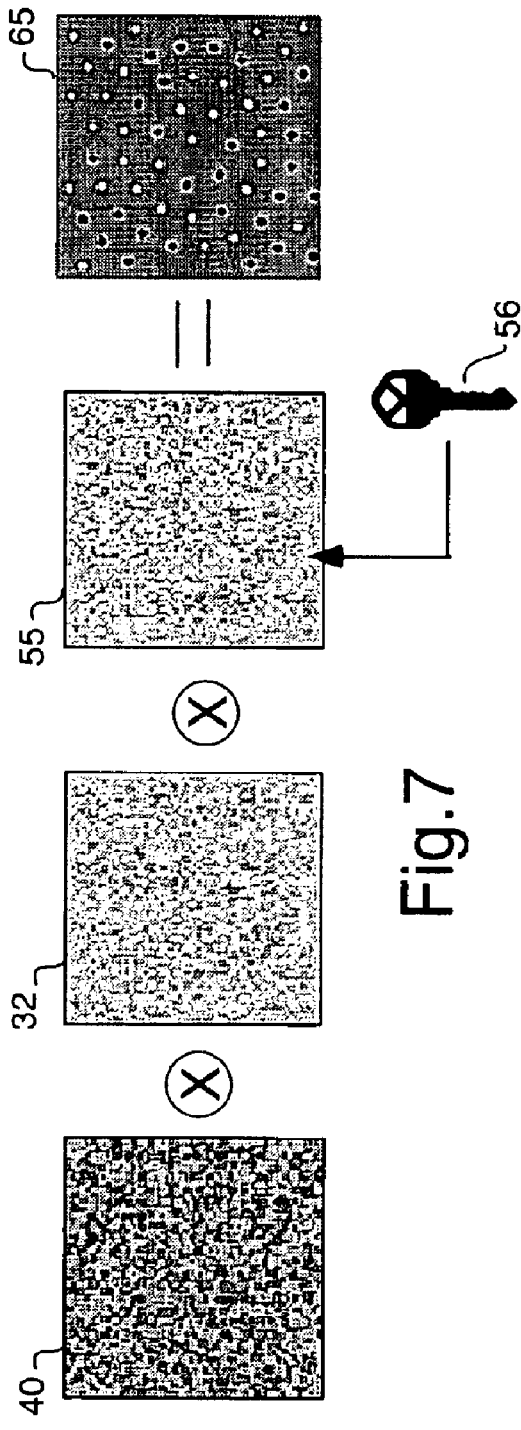

AUTHENTICATABLE IMAGE WITH AN EMBEDDED IMAGE HAVING A DISCERNIBLE PHYSICAL CHARACTERISTIC WITH IMPROVED SECURITY FEATURE

FIELD OF THE INVENTION

The invention relates generally to the field of image processing, and in particular to providing a secure document such as a passport, event ticket, currency, or a postal stamp, coupon or envelope.

BACKGROUND OF THE INVENTION

In U.S. patent application, Ser. No. 09/613,989, a method is disclosed that enables the use of paper or textured media to be authenticated based upon an embedded signal derived from the physical textural attributes of the media. A carrier is formed by scanning a region or multiple regions of the media and is convolved with a message to form an authenticable signal. After scanning, the carrier is subdivided and rearranged in ways that prevents a person from "discovering" the carrier.

Although this method is satisfactory, it includes drawbacks. One such drawback is that it adversely affects the robustness of the data-embedding algorithm. When the receiver having the carrier is being verified as authentic, the carrier regions must be rescanned. Any scanning errors introduced, for example, in scanning angle, in scanning starting point, or in scanning scale are compounded proportionately to the number of subdivisions, mirrors or other manipulations applied to improve security. These errors affect the algorithms robustness or equivalently the data capacity of the algorithm.

Consequently, a need exists for a means to either completely overcome the errors introduced by the rescanning process or to minimize their effect while improving overall security of the processes.

SUMMARY OF THE INVENTION

The present invention is directed to overcoming one or more of the problems set forth above. Briefly summarized, according to one aspect of the present invention, the invention resides in a method for creating an authentic image on a receiver, the method comprising the steps of: (a) providing a first carrier formed from information related to a physical characteristic of the receiver; (b) providing a second carrier that is randomly generated; (c) combining the first and second carrier such that the first carrier cannot be derived without the second carrier for forming a combined carrier; (d) combining the combined carrier with predetermined content for forming the authentic image having the predetermined content; and (e) including the authentic image having the predetermined content on the receiver.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6 is a diagram illustrating convolving a message with two carriers to form a secure dispersed mesage;

FIG. 7 is a diagram illustrating correlating the embedded image with the two carriers for extracting the message;

DETAILED DESCRIPTION OF THE INVENTION

As used herein, authenticable means capable of verifying or capable or proving authenticity.

Figure 1:
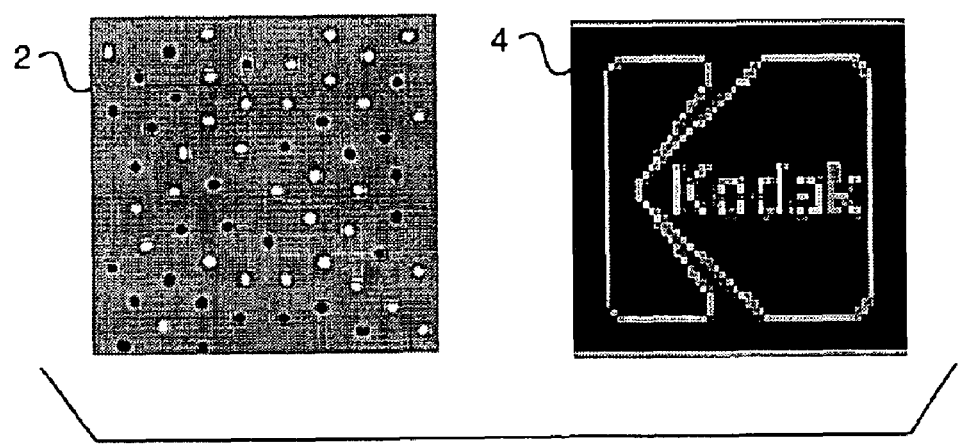
FIG. 1 illustrates a binary message image and an iconic message image as an edge map depicting a Kodak trademark.

The invention utilizes aspects of data embedding. The science of data embedding is also referred to as data hiding, information hiding, watermarking and steganography. A preferred basic data embedding technique is disclosed in Honsinger, et al., U.S. Pat. No. 6,044,156. A review of this technique and associated embellishments to the technique is briefly discussed hereinbelow. An original image is represented as the two-dimensional array, $I(x,y)$, the embedded image, $I'(x,y)$, and a carrier is defined as $C(x,y)$. A message that is embedded, $M(x,y)$, in its most general form, is an image. The message can represent an icon, for example, a trademark, or may represent the bits in a binary message. In the latter case the on and off states of the bits are represented as plus and minus ones, or positive and negative delta functions (spikes) which are placed in predefined and unique locations across the message image. Reffering to FIG. 1, an example of a binary message image 2 and an iconic message image 4 is shown. Examples of iconic data types are trademarks, corporate logos or other arbitrary images. Performance generally decreases as the message energy increases so edge maps of the icons are used. Examples of binary data types are 32 bit representations of URL's, and copyright ID codes, or authentication information.

With these definitions, the preferred embedding equation is:

$$I'(x,y) = \alpha(M(x,y)*C(x,y)) + I(x,y) \qquad (1)$$

where the symbol, *, represents circular convolution and $\alpha$ is an arbitrary constant chosen to make the embedded energy simultaneously invisible and robust to common processing. From Fourier theory, spatial convolution in the frequency domain is the same as adding phase while multiplying magnitudes. Therefore, the effects of combining the message with a carrier, such as by the described convolution technique, distributes the message energy in accordance with the phase of the carrier and to modulate the amplitude spectrum of the message with the amplitude spectrum of the carrier. If the message were a single delta function and the carrier of random phase and of uniform Fourier magnitude, the effect of convolving with the carrier would be to distribute the delta function over space. Similarly, the effect of convolving a message with a random phase carrier is to spatially disperse the message energy.

The preferred extraction process is to correlate with the same carrier used to embed the image:

$$I'(x,y) \otimes C(x,y) = \alpha(M(x,y)*C(x,y)) \otimes C(x,y) + I(x,y) \otimes C(x,y), \qquad (2)$$

where the symbol, $\otimes$, represents circular correlation. Correlation is similar to convolution in that Fourier magnitudes also multiply. In correlation, however, phase subtracts.

Therefore, the phase of the carrier subtracts on correlation of the embedded image with the carrier leaving the message. Indeed, assuming that the carrier is designed to have uniform Fourier amplitude, then, and the process of correlation of the carrier on the embedded image Eq. 2, can be reduced to:

$$I'(x,y) \otimes C(x,y) = \alpha M(x,y) + \text{noise} \qquad (3)$$

That is, the process of correlation of the embedded image with the carrier reproduces the message image plus noise due to the cross correlation of the image with the carrier.

Tiling the dispersed message on the original image improves the robustness of the algorithm. For this invention, preferably, a single 256×256 dispersed message is tiled over the entire image. Upon extraction, each 256×256 region is aligned and summed to produce the final message. As disclosed in U.S. Pat. No. 6,567,532, issued on May 20, 2003, for imaging applications with severe quality loss, such as small images printed using ink-jet printers on paper, a weighting factor that depends on the estimated signal to noise ratio can be calculated and applied to each extracted message element before summation.

The extracted message is denoted as M'(x,y), the equation for extracting the message (Eq. 2 and Eq. 3) can be rewritten as:

$$M'(x,y) = \alpha M(x,y) * (C(x,y) \otimes C(x,y)) + \text{noise} \qquad (4)$$

The above equation suggests that the resolution of the extracted message is fundamentally limited by the autocorrelation function of the carrier, $C(x,y) \otimes C(x,y)$. Any broadening of $C(x,y) \otimes C(x,y)$ from a delta function will blur the extracted message when compared to the original message. Another way to view the effect of the carrier on the extracted message is to consider $C(x,y) \otimes C(x,y)$ as a point spread function, since convolution of the original message with $C(x,y) \otimes C(x,y)$ largely determines the extracted message.

The design of the carrier should consider both the visual detectability of the embedded signal and the expected signal quality at the extraction step. There is clearly a design tradeoff between achieving optimum extracted signal quality and embedded signal invisibility.

A carrier designed for optimal extracted signal quality will possess increasing amplitude with increasing spatial frequency. This may be derived from the well-known characteristic of typical images that the Fourier amplitude spectrum falls as the inverse of spatial frequency. At low spatial frequencies, where typical images have their highest energy and influence on the extracted image, the present invention carrier uses this result. In particular, the mean or DC frequency amplitude of our carrier is always zero. As spatial frequency is increased, the carrier amplitude envelope smoothly increases with increasing spatial frequency until about 1/16 to 1/5 Nyquist.

Figure 2:
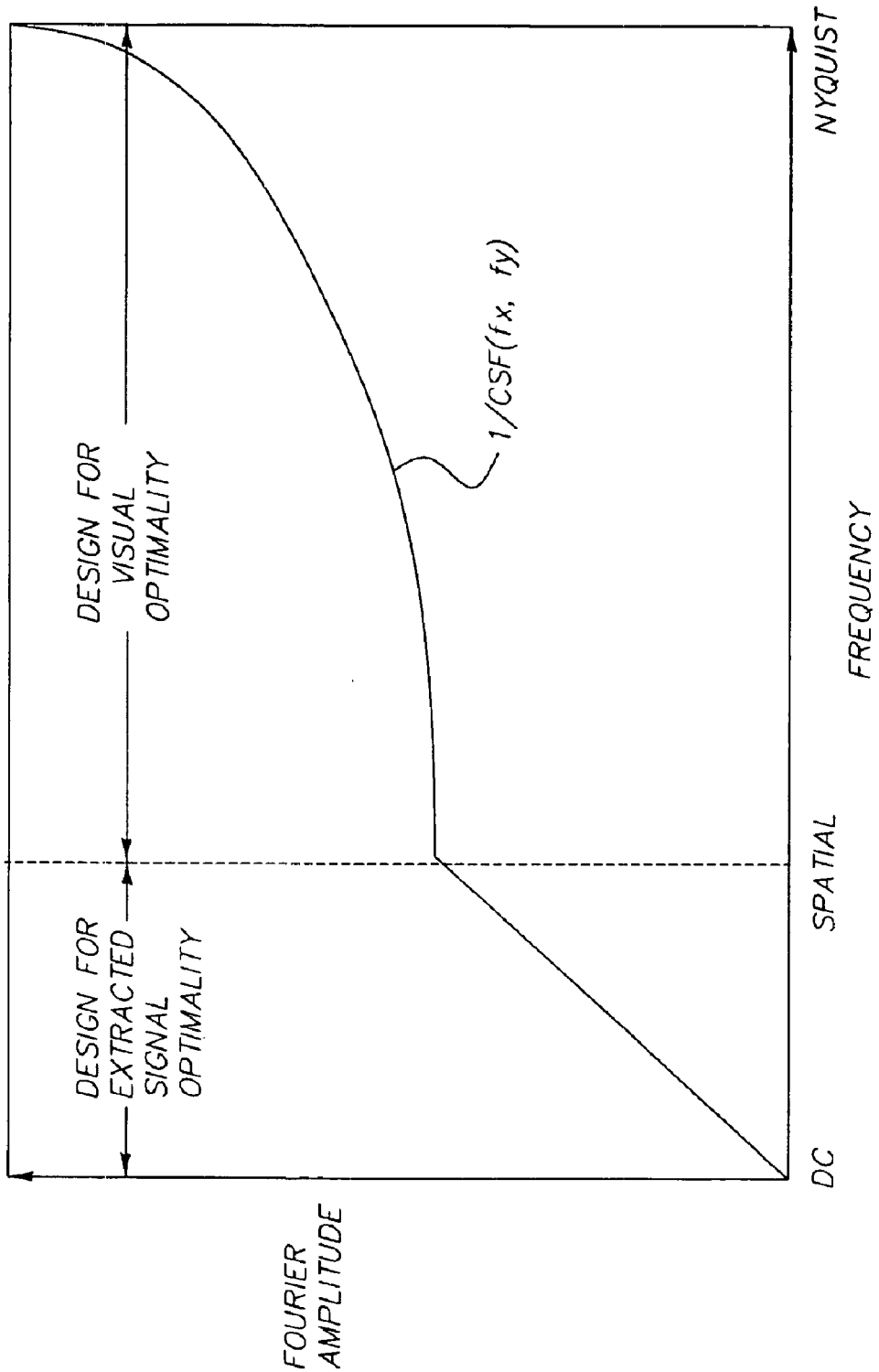
FIG. 2 is a graph depicting the Fourier amplitude vs. the spatial frequency of an optimally designed carrier.

For frequencies greater than this, the carrier envelope is derived from a Contrast Sensitivity Function (CSF). A graph representing a one-dimensional slice of the Fourier amplitude of such a carrier is depicted in FIG. 2. Use of the CSF in an image embedding application is described in greater detail in Daly, U.S. Pat. No. 5,905,819.

The CSF provides a measure of the sensitivity of the average observer to changes in contrast at a given spatial frequency. The reciprocal of the CSF can be used to prescribe the amount of amplitude needed for the embedded signal to be detectable by an average viewer. Many modern CSF models facilitate for observer viewing distance, background noise, receiver dot density, color component wavelength and other factors.

Use of these CSF parameters can be an advantage when optimizing an embedding algorithm for a specific application. One particularly useful way of sizing the embedding algorithm for a specific system is to define the quality of the embedded signal in terms of the viewing distance at which the embedded signal can be visually detected. Once this is defined, an optimized carrier can be immediately derived and tested.

For a binary message, the impact of this carrier envelope is to produce a very small sidelobe around each delta function. It may be argued that the sidelobes limit the bandwidth of the algorithm. However, it has been found that the destructive processes of compression, error diffusion, printing and scanning have a far greater influence on the bandwidth of the algorithm. In a binary message, these destructive processes are the limiting factor of the bit density and can be thought of as defining the minimum separation distance between the delta functions. So long as the sidelobes are confined within half of the minimum bit separation distance, sidelobe interference may be considered minimal.

Correcting for rotation, scaling and skew is a fundamental element of all robust data embedding techniques. In Honsinger, et.al, U.S. Pat. No. 5,835,639, Method for detecting rotation and magnification in images, a preferred method of correction of rotation and scale is provided. The correction technique relies on autocorrelation the embedded image. For example, upon autocorrelation of an embedded image that has not been rotated or scaled, one would expect to see correlation peaks spaced horizontally and vertically at intervals of 256 pixels and 256 lines. At the zero offset correlation point, there is a very high peak due to the image correlating with itself.

Now, if the embedded image is scaled, the peaks must scale proportionately. Similarly, if the embedded image is rotated, the peaks must rotate by the same amount. Therefore, the rotation and scale of an image can be deduced by locating the autocorrelation peaks. Detection of the actual rotation angle θ is limited to angles in the range (−45°, +45°]. However, the actual rotation angle will be a member of the set $\theta_{actual} = \theta_{calculated} \pm n90°$, where n is an integer. Because of the possibility that the image has been flipped or rotated in increments of 90 degrees during the message extraction process, this ambiguity is not a fundamental limitation. It can be shown that this method can correct for a general affine transform since an affine transform preserves relative shapes. That is, a shape that is repeated twice will still appear twice, and the new shapes will still be identical providing a good autocorrelation for realistic applications of data embedding.

The effect of the autocorrelation properties of the original image can be significant. Without ancillary processing, high amplitude low frequency interference in the autocorrelation image can make the process of detecting peaks difficult. To minimize this problem, localized first order and second order moment normalization on the embedded image before the autocorrelation. This process consists of replacing each pixel in the image with a new pixel value, $v_{new}$:

$$v_{new} = \frac{\sigma_{desired}}{\sigma_{old}} (v_{old} - m_{old}) \qquad (5)$$

where $v_{old}$, is the original pixel value, $m_{old}$, is the local mean of the image, $\sigma_{desired}$ is the desired standard deviation, which is generally set to the expected embedded signal standard deviation and $\sigma_{old}$ is the local standard deviation. Because this operation is over a small area, typically over a (3×3) or (5×5) region, its effect in removing the high amplitude, low frequency coherent noise is quite substantial. For the limiting case when $\sigma_{old} \to 0$, $v_{new}$ is equated to a value taken from a random noise generator having a standard deviation $\sigma_{desired}$.

The next piece of ancillary processing performed is to shape the autocorrelation peaks. This is done during the FFT operation used in the autocorrelation processing. A function that increases linearly with spatial frequency in the Fourier magnitude domain is quite satisfactory. This function is consistent with a Wiener filter designed to maximize the semblance of the correlation peaks to delta functions under the assumption that the image Fourier amplitude spectrum exhibits an asymptotic "1/(spatial frequency)" falloff. Following these processing steps produces peaks that need little further processing.

Importantly, because autocorrelating the embedded image requires no extra calibration signal, it does not tax the information capacity of the embedding system. In addition, this technique can be applied to any embedding technique with redundant embedded signals and may implemented on a local level to confront low order geometric warps.

The ability to recover from cropping is an essential component of a data embedding algorithm. As disclosed in U.S. Pat. No. 6,678,390, issued on Jan. 13, 2004, if one were to extract from an arbitrarily located 256×256 region of an embedded image, the extracted message would probably appear to be circularly shifted due to the unlikely chance that the extraction occurred along the original message boundary.

Indeed, if the origin of the 256×256 extracted region was a distance, $(\Delta x, \Delta y)$, from its nearest "original" origin, then the extracted message, $M'(x,y)$ can be written as:

$$M'(x,y) = M(x,y) * \delta(x-\Delta x, y-\Delta y) \quad (6)$$

where it has been assumed that the convolution is circular, that the carrier autocorrelated to a delta function and that the image contributes no noise.

On the surface, this circular shift ambiguity is a severe limitation on data capacity because it imposes the constraint that the message structure must be invariant to cyclic shifts. However, the present invention provides a way around this by placing the bits in the message in a special manner. First, there is required the use of a "message template," that is, a prescription of where to place the bits in a message image. The message template is derived by placing positive delta functions on a blank 256×256 image such that each delta function is located a minimum distance away from all others and such that the autocorrelation of the message template yields as close as possible, a delta function. That is, the bits are placed such that the message template autocorrelation sidelobes are of minimal amplitude.

Now, correlation of the extracted region with a zero mean carrier guarantees that the extracted circularly shifted message $M'(x,y)$ is also zero mean. If the message template is called, $T(x,y)$, then the absolute value of the the extracted template must be practically equivalent to a circularly shifted message template. That is, $$|M'(x,y)| = T(x,y) * \delta(x-\Delta x, y-\Delta y) \quad (7)$$

This implies, due to the autocorrelation property of the message template, that the shift from the origin of the message can be derived by correlating $|M'(x,y)|$ with $T(x,y)$, since:

$$|M'(x,y)| \otimes T(x,y) = \delta(x-\Delta x, y-\Delta y) \quad (8)$$

Therefore, the result of the correlation will be a 256×256 image, whose highest peak will be located at the desired shift distance, $(\Delta x, \Delta y)$. This peak location can be used to correctly orient the interpretation of the embedded bits.

There are many applications of this invention to media. A paycheck, a will, a product label, or any media that it is wished to prove that it is an original. For the sake of specificity, we shall choose an envelope with a stamp as a preferred embodiment. Here the media to be scanned to form a carrier is paper, however, it is understood that virtually any media will suffice as a receiver so long as it has a discernible physical characteristic which is subject to a reasonably high resolution scan for producing a carrier.

Figure 3:
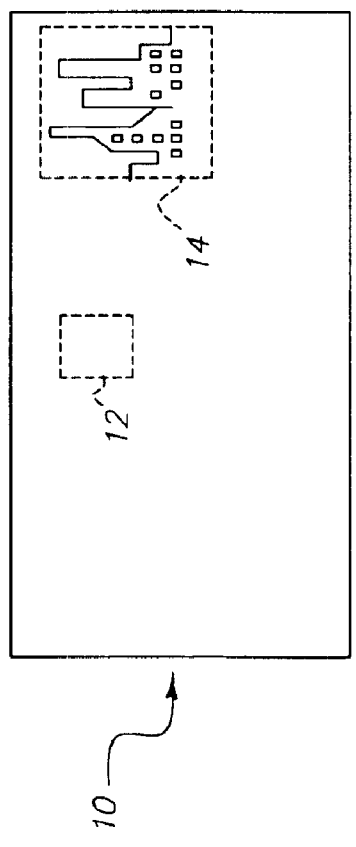
FIG. 3 illustrates a receiver containing a carrier scan region picture that has been embedded with information.
Figure 4:
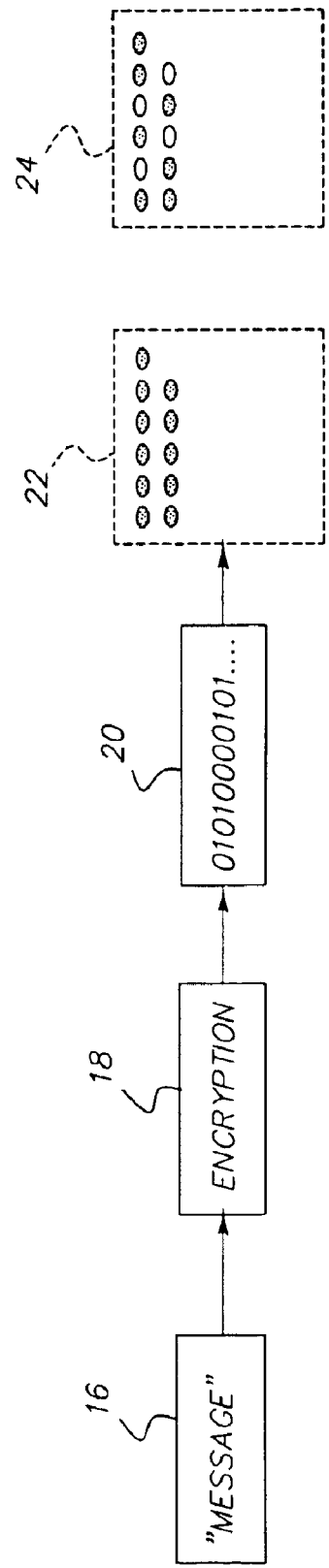
FIG. 4 illustrates a sequence of steps for converting a message into a format appropriate for embedding into an image.

In accordance with the present invention, a self authenticating media using a public fiber carrier and an auxiliary private carrier will now be described in more detail. FIG. 3 shows a medium, such as a medium 10, in this case paper, containing a scan area 12, and a picture used to hide the secure embedded image 14. FIG. 4 is a block diagram showing the steps needed to form the message image needed to practice the invention using the technique outlined above. The message, shown in block 16, should contain information such as postage. If the message only contained postage, for example 33 cents, and if the maximum postage allowed for the size of the envelope was $2.56, then eight bits ($2^8=256$) of information would be needed to convey all postage amounts. However, performance is not substantially degraded when using 32 or 64 bits, when compared to 8 bits, providing a much greater number level of possibilities. Once the message has been expressed in its binary form, it is possible to encrypt, as shown in block 18, by using any desired encryption algorithm. One encryption technique is a public/private key technique. Using a public/private key technique enables only the message generator to know how to encrypt the message. The entity performing the validation or authentication can only decrypt the message with its own key. Public/private key encryption is well known to anyone conversant in encryption technologies. In the case of a postage stamp, a private key encryption system would suffice given that the post office would control both the encryption and decryption process. However, in the case of a currency, wherein a government authorizes many different vendors to build authenticating ATM (automated teller machines) a public/private scheme would make more sense. This is because by allowing the multiple vendors of the ATM machines the same key used to generate the message, the government would increase the chances that a vendor would use the key to generate counterfeit currency, After the encryption, the bits shown in block 20 are placed on a message template 22 according to known bit placement rule. As a preferred embodiment, assuming one takes the first bit and place it on the message template in the topmost and leftmost possible position. If the first bit is a 1, the value 1 is disposed in a first position. If the bit is a zero, the value a −1 in the first position. The next bit from 20 is placed in the next top most left most position available, using the same rules for polarity. This process continues in this fashion until all bits placed yielding the message image 24.

Figure 5:
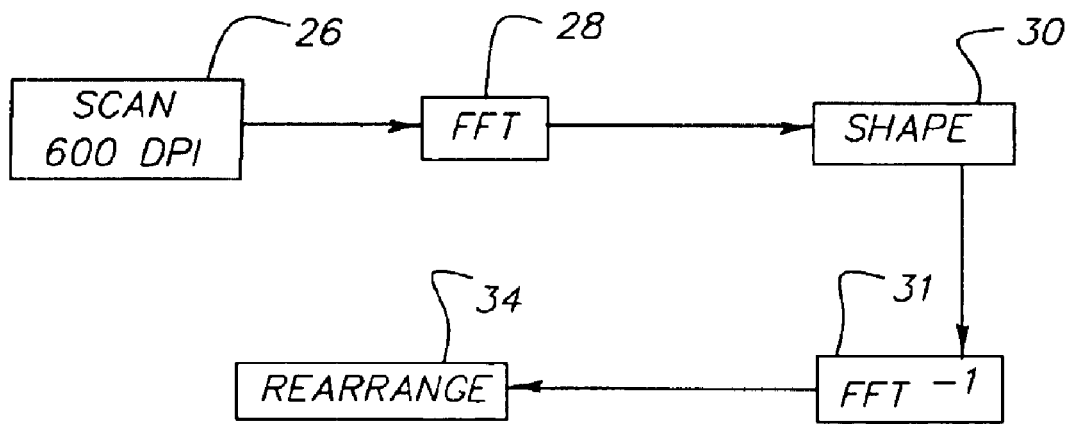
FIG. 5 is a depicts a block diagram for the process of forming a secure carrier from a scan.

The message image needs to be convolved with the carrier derived from the fibrous character of the paper. The process of forming a carrier is depicted in FIG. 5. Scan area 12 is scanned at a high resolution in block 26. In a preferred embodiment, the area is scanned at 300 or 600 dpi. For concreteness, choose 600 dpi as a preferred scanning resolution. Once this image is obtained, it is transformed to the Fourier domain as shown in block 28. The objective of the shaping step as shown in block 30 is to provide a carrier that maintains the fibrous character of the scan, but also provides an efficient information carrying entity. This shaping process is described in detail in U.S. patent application Ser. No. 09/613,989. After the shaping, the image is inverse Fourier transformed in block 31 to form a shaped carrier. The shaped carrier is rearranged in block 34 as described in U.S. patent application Ser. No. 09/613,989. The rearrangement step is intended to provide an additional level of security. Specifically, because a counterfeiter might determine the region of the paper where the carrier is derived either by the users explicit use of fiducials or by trial and error, rearrangement of the data in the shaped carrier is a reasonable security measure. The shaped scanned carrier is divided into 16 equal area regions as also described in U.S. patent application Ser. No. 09/613,989. Each of the subregions (64×64) is placed into a different place in the carrier image. It is important to make sure that there are no blank areas. To better appreciate this, an illustration is helpful. In this regard, imagine constructing a blank 256×256 image. Next, take a region from the equally divided area shaped scanned carrier. Place this in one of the equally divided areas in the blank image. There are 16 possible positions. Repeat the process with the next data from the shaped scanned carrier. There are now 15 possible positions to place this. The rearrangement step allows the carrier data to have 16! (16 factorial or 20,922, 789,888,000) different renditions. Additionally each of the carriers can be randomly flipped or rotated (in 90 degree increments) to make the counterfeiting even more difficult. The prescription of the placement steps can be perform in accordance with a key known only to the authentication authorities.

A shortcoming of rearranging the carrier is that it adversely affects the robustness of the data-embedding algorithm because during the carrier formation stage at the authentication step, the regions must be rescanned, and any scanning errors introduced, say, in scanning angle, in scanning starting point, or in scanning scale are compounded proportionately to the number of subdivisions, flips or other manipulations. These errors affect the algorithms robustness or equivalently the data capacity of the algorithm.

Although the rearrangement step described above can produce a secure system, another even more secure algorithm can be used either independently or in combination with the above steps. In this regard, a second carrier is produced with a substantially flat or equivalently, uniform amplitude spectrum, which is also generated from a random key. One method for performing this is described in U.S. Pat. No. 6,044,156 by Honsinger, et al. This can be convolved with a first carrier, which is scanned from the paper either directly or as described above. The result of this convolution is a third carrier. The third carrier is used to convolve with the message. Since second carrier can only be reproduced with the key, the third carrier cannot be reproduced without the key. This provides a system that depends on the media, as in the prior art, and an additional key that is completely independent of the media itself.

Convolution can be described in either the space domain or the frequency domain. In the frequency domain, convolution of two functions is the same as multiplying amplitude spectra and adding the phases. Correlation is identical to convolution in that magnitudes multiply; however, in correlation phase subtracts. Therefore, convolving an image with a uniform carrier preserves the magnitude structure of the image. Correlating with the same uniform carrier will subtract out the phase dispersion induced by the second carrier leaving us with a carrier substantially the same as in prior art. Since the key is known to no one but the generating authority and the receiving authority, a very secure system is available regardless if one subsections and permutes the fibrous region scanned from the media.

Accordingly, the output of the rearrangement step 34 of FIG. 5 is replaced in the present invention by the output of the process detailed in FIG. 6. FIG. 6. depicts the process of forming a secure dispersed message 60. A message image 24 is provided. In a postage application the message contents can be postage amount, zip codes, or hashes of the destination address. As described previously, the message can be encrypted, if desired. Next the carrier derived from the media 32 is convolved with the message image to form the first convolved image. Next, the secret key 56 is used to generate a second carrier 55, which is convolved with the first convolved image to form the secure dispersed message 60. Switching the order of convolution between carrier 28 and carrier 55 makes no difference to the final output because convolution simply adds phase and multiplies the Fourier magnitudes. It is understood that convolution can be performed as correlation in the Fourier Domain without comprise, as is well known in the art.

As mentioned above, the objective of the shaping step as shown in FIG. 5 block 30 is to provide a carrier that maintains the fibrous character of the scan, but also to provide an efficient information carrying entity. The shaping step shown in block 30 of FIG. 5 will now be described in greater detail. The shaping of the amplitude spectrum (derived from the FFT data) is performed with respect to the human visual system and sharpness loss due to the printing process. The human visual system's role was described during the discussion of FIG. 2 above. Recall that except for near the DC frequency, a Fourier amplitude spectrum is created that is proportional the inverse CSF. A carrier derived in this manner can be improved on further by realizing that when printing an image on a receiver, the modulation transfer function (MTF) of the printer can be backed out before printing. (A function that expresses the ability of an optical or electronic device to transfer signals faithfully as a function of the spatial of the signal is commonly known as a modulation transfer function (MTF). The MTF is the ratio of the percentage modulation of a sinusoidal signal leaving to that entering the device over the range of frequencies of interest.)

Therefore except for the very low frequencies around DC, the Fourier amplitude should be proportional to:

$$MTF_{printer}^{-1}(u,v)CSF_{viewing\ conditions}^{-1}(u,v) \qquad (9)$$

(u,v represent spatial frequencies of the two dimensional FFT)

It is important to note that the input data to the FFT is real. The input spatial imaginary component is comprised entirely of zeros. However, in the Fourier domain, there will be an imaginary component. After shaping we'd like to make sure that the inverse FFT provides a zero valued imaginary component. This ensures that energy defined in the FFT domain was not wasted. The concepts involved with ensuring that the inverse FFT is real is detailed in Honsinger, et al., U.S. Pat. No. 6,044,156.

Now, it is well known to those in the practice of image processing that the phase contains the important information in an image, maintaining this information for this application is of paramount importance. The phase information of the Fourier transform contains the bulk of fibrous structure information. Only the amplitude spectrum of the FFT data should be modified during this shaping process. The phase value at each Fourier frequency should always be maintained. Recall that Fourier phase is given by the equation:

$$\theta(u,v)=\tan^{-1}(\text{Imaginary}(F(u,v))/\text{Real}(F(u,v))) \qquad (10)$$

Recall also that Fourier amplitude is given by the equation:

$$\text{amplitude}(u,v)=\sqrt{\text{Imaginary}(F(u,v))^2+\text{Real}(F(u,v))^2} \qquad (11)$$

If one were to multiply both Imaginary(F(u,v)) and Real(F (u,v)) by α(u,v), the phase (see equation 10) is maintained and the amplitude spectrum (see equation 11) is modified. Therefore, the modification of the Fourier amplitude spectrum can be performed by multiplying the real and the imaginary components of the Fourier transform by the scalar that gives us the desired amplitude. If, $$\alpha(u,v) = MTF_{printer}^{-1}(u,v)CSF_{viewing\ conditions}^{-1}(u,v)/ \qquad (12)$$

-continued $$\sqrt{\text{Imaginary}(F(u, v))^2 + \text{Real}(F(u, v))^2}$$

Then, the shaping step is simply performed by multiplying each component of the real and imaginary Fourier coefficients by α(u,v), that is:

$$\text{Imaginary}(F_{new}(u,v)) = \alpha(u,v) \text{Imaginary}(F(u,v)) \quad (13)$$

$$\text{Real}(F_{new}(u,v)) = \alpha(u,v) \text{Real}(F(u,v)) \quad (14)$$

When it comes time to extract the message, a user may or may not have the scanned carrier available. If the carrier is not known beforehand, then it becomes necessary to rescan it from the paper. In this case, assume that the location of the carrier (that is, the location of the fibrous region) is known in advance. The carrier is obtained by repeating the steps of FIG. 5 with the exception of the rearrangement step 34. That is, the process of FIG. 5 is terminated at step 32, which yields the shaped carrier.

FIG. 7 depicts the decoding of the embedded image. The secure embedded image 14 is scanned to form the scanned secure embedded image 40. If a secure carrier has not been provided, the steps of FIG. 5 must be performed on the scan area 12 to form the shaped carrier 32. The shaped carrier 32 is correlated with the scanned secure embedded image 40. Following this, a key 56 is provided to form the second carrier 55. Optionally, the second carrier 55 may be stored instead of the key. The result of the correlation between the shaped carrier 32 and the scanned secure embedded image 40 is correlated with the second carrier 55. The result of the second correlation is the extracted message image 65. The extracted message can now be decoded using the art described above. As mentioned above, one needs to know where the bit values of the extracted message image 65 are located to properly interpret the message contents.

Figure 8:
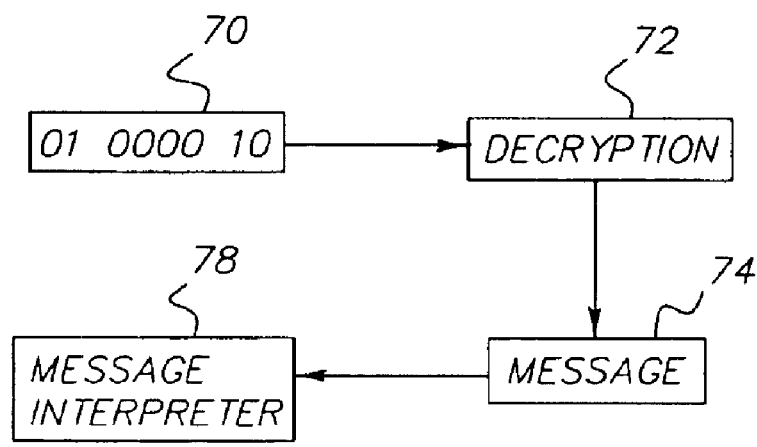
FIG. 8 depicts the process, in block diagram form, of decrypting the extracting message for discerning the message.

Referring now to FIG. 8., the result of finding the location of each bit on the extracted message image 65 and tabulating the bits in a predetermined way is the extracted encrypted message 70. The extracted encrypted message 70 is decrypted 72 using a private key. The result of this is the embedded message 74. The embedded message is interpreted 78 by comparing to a table stored in the computer or computerized device. The table delineates all of the known valid messages. If the embedded message is the same as a known valid entry, then the letter is declared authentic, if not, the letter is declared suspicious or invalid and is given special attention.

The invention has been described in detail with particular reference to certain preferred embodiments thereof, but it will be understood that variations and modifications can be effected within the spirit and scope of the invention.

Parts List 2 binary message image
4 iconic message image
12 scan area
14 secure embedded image
16 message
18 encryption
20 bits from encryption
22 message template
24 message image
26 scanning
28 transforming
30 shaping
31 inverse transforming
32 media
34 rearrange
40 secure embedded image
55 second carrier
56 secret key
60 dispersed image
65 extracted message image
70 extracted encrypted message
72 decrypted
74 embedded image
78 message interpreter

What is claimed is:

1. A method for creating an authenticable image on a receiver, the method comprising the steps of:
    (a) providing a first carrier formed from information related to a physical characteristic of the receiver;
    (b) providing a second carrier that is randomly generated;
    (c) combining the first and second carrier such that the first carrier cannot be derived without the second carrier for forming a combined carrier;
    (d) combining the combined carrier with predetermined content for forming the authenticable image having the predetermined content; and
    (e) including the authenticable image having the predetermined content on the receiver.

2. The method of claim 1, wherein step (a) includes providing fibrous content as the discernible physical characteristic of the receiver.

3. The method as in claim 2, wherein step (a) includes creating the first carrier from scanning a predetermined region of the receiver.

4. The method of claim 1, wherein steps (a) and (b) include creating the first and second carriers by:
    i) transforming the carrier to a Frequency domain to form a transformed carrier;
    ii) shaping a spectrum of the transformed earner to cancel the anticipated MTF effect of the print process or to facilitate the human visual system; and
    iii) inverse transforming the transformed carrier.

5. The method of claim 1 further comprising the step of encrypting the predetermined content.

6. A method of authenticating a receiver having an authenticable image that includes predetermined content integrally combined with information related to the discernible physical characteristic of the receiver, and integrally combined with a second carrier generated from a random key, the method comprising the steps of:
    (a) scanning the authenticatable image on the receiver to produce information related to the discrenible physical characteristic of the receiver;
    (b) discerning the physical characteristics to form the first earner;
    (c) providing a second carrier generated from a random key;
    (d) discerning a message using the first and second carriers in combination with the scanned authenticable image;
    (e) providing the predetermined content; and
    (f) determining the authenticiy of the receiver upon comparing the message with the predetermined content.

7. The method of claim 6, wherein step (c) includes discerning the physical characteristic of the authenticated receiver by scanning a portion of the receiver on which the authenticatable image is formed.

8. The method of claim 7, wherein step (c) includes determining fibrous content as the discernible physical characteristic of the receiver.

* * * * *

UNITED STATES PATENT AND TRADEMARK OFFICE
CERTIFICATE OF CORRECTION

PATENT NO. : 6,925,192 B2
DATED : August 2, 2005
INVENTOR(S) : Chris W. Honsinger et al.

It is certified that error appears in the above-identified patent and that said Letters Patent is hereby corrected as shown below:

Column 10,
Line 34, after "transformed" delete "earner" and insert -- carrier --.
Line 50, delete "earner" and insert -- carrier --.

Signed and Sealed this

Fifteenth Day of November, 2005

JON W. DUDAS
*Director of the United States Patent and Trademark Office*